United States Patent [19]
Pirchl

[11] Patent Number: 5,996,730
[45] Date of Patent: Dec. 7, 1999

[54] HEAT SHIELD WITH ACOUSTIC INSULATION

[75] Inventor: Gerhard Pirchl, Birrwil, Switzerland

[73] Assignee: Hecralmat, Liechtenstein

[21] Appl. No.: 09/085,215

[22] Filed: May 27, 1998

[30] Foreign Application Priority Data

May 27, 1997 [DE] Germany ............ 197 22 037

[51] Int. Cl.$^6$ ............................ F01N 5/00
[52] U.S. Cl. ............ 181/211; 181/290; 180/89.2; 123/195 C
[58] Field of Search ............ 181/211, 240, 181/282, 290, 294; 123/195 C; 60/299; 180/89.2

[56] References Cited

U.S. PATENT DOCUMENTS

| | | |
|---|---|---|
| 3,237,716 | 3/1966 | Parsons . |
| 5,464,952 | 11/1995 | Shah et al. . |
| 5,496,069 | 3/1996 | Milligan ............ 280/832 |
| 5,590,524 | 1/1997 | Moore, III et al. ............ 181/240 |
| 5,603,297 | 2/1997 | Wolf et al. ............ 123/195 C |
| 5,680,757 | 10/1997 | Pirchl ............ 60/299 |

FOREIGN PATENT DOCUMENTS

| | | |
|---|---|---|
| 0 503 580 A1 | 9/1992 | European Pat. Off. . |
| 0 508 145 A1 | 10/1992 | European Pat. Off. . |
| 0 662 564 A1 | 7/1995 | European Pat. Off. . |
| 0 697 559 A2 | 2/1996 | European Pat. Off. . |
| 2037135 | 9/1971 | Germany . |
| 38 34 054 C2 | 4/1990 | Germany . |
| 90 10 136 U | 9/1990 | Germany . |
| 91 07 484 U | 8/1991 | Germany . |
| 92 02 228 U | 4/1992 | Germany . |
| 41 03 083 C1 | 5/1992 | Germany . |
| 42 08 501 A1 | 9/1993 | Germany . |
| 42 35 052 A1 | 4/1994 | Germany . |
| 43 31 060 C1 | 6/1994 | Germany . |
| 43 37 738 A1 | 5/1995 | Germany . |
| 44 37 380 A1 | 7/1995 | Germany . |
| 295 17 693 U1 | 12/1995 | Germany . |

Primary Examiner—Khanh Dang
Attorney, Agent, or Firm—Brown, Martin, Haller & McClain, LLP

[57] ABSTRACT

The invention relates to a heat shield with acoustic insulation, comprised of a heat-shielding sheet which bears, on its side facing the heat- and acoustic noise-emitting source, a supporting sublayer bearing an acoustic absorption layer affixed to said sublayer, wherewith said supporting sublayer is disposed such that a defined air gap remains between the heat-shielding sheet and the supporting sublayer.

9 Claims, 1 Drawing Sheet

HEAT SHIELD WITH ACOUSTIC INSULATION

BACKGROUND OF THE INVENTION

The invention relates to a heat shield with acoustic insulation. Such heat shields are used, e.g., in motor vehicles, in order to provide a shield between the exhaust muffler (along with other heat-conducting parts of the exhaust system, such as the catalytic unit) and the vehicle body, thereby preventing any appreciable radiated heat from impinging on the vehicle body, and at the same time providing effective acoustic insulation.

According to the state of the art it is known to use an aluminum sheet as a heat shield, disposed adjacent to the heat source (e.g. an exhaust pipe), at a location above the heat source (e.g. particular between said exhaust pipe and the vehicle body). Such shields may have a three-dimensional curved shape, e.g. generally the shape of a cylindrical segment. Further, the sheet may be corrugated or textured. An aluminum sheet of this type has the drawback that, while providing good heat shielding, its acoustic insulation performance is in the range of unsatisfactory to nonexistent.

It is further known to provide acoustic insulation in the form of a mineral foam, disposed on the back side of a heat shield sheet, wherewith in order to achieve a specified level of acoustic insulation the sheet is perforated with appropriate openings.

However, such a device has the disadvantage that the perforations sacrifice most of the heat shielding performance, because most of the [irradiated] heat is capable of penetrating the perforations. A further disadvantage is that the acoustic insulation, being disposed on the back side of the shield sheet, performs only poorly.

Also known is the application of an acoustic insulation layer comprised of mineral material, e.g. mineral foam, to the inner side of the aluminum sheet, i.e. the side facing the heat source.

This is attended by the disadvantage that the thermal stress on the mineral insulation is substantially increased, and the metal shield sheet can no longer reflect sufficient heat back toward the irradiating source. As a result, the shielding performance of the device is inadequate, since a substantial part of the heat penetrates the shield in the direction of the vehicle body, rather than being reflected away.

SUMMARY OF THE INVENTION

Accordingly, the underlying problem of the present invention is to devise improvements in a heat shield with acoustic insulation, which shield device is of the type described initially supra, whereby a substantially improved heat shielding effect is provided, along with an improved acoustic insulation effect.

According to the present invention, a heat shield with acoustic insulation is provided, which comprises a first, acoustic absorption layer having opposite first and second sides, a second, supporting layer affixed to the second side of the acoustic absorption layer, and a third, heat shielding layer attached to the first and second layers and spaced from the second layer to define an air gap between the second and third layers.

The first side of the acoustic absorption layer faces a heat and acoustic noise emitting source. The acoustic absorption layer is of any suitable acoustic absorption material, preferably fiber felt, and is suitably bound or fastened to the supporting layer. The acoustic absorption material is also heat-resistant.

The invention thus provides a multi-layer structure, whereby an air gap is created inwardly of the inner side of a heat-shielding sheet, and a supporting sublayer is provided which is disposed inwardly of the inner side of said heat-shielding sheet, the supporting sublayer forming a boundary to the air gap on the inward side. The supporting sublayer may be comprised of a metal foil, a metal sheet, a gauze or grid, a perforated foil, a continuous foil, a corrugated or textured foil, an organic or inorganic support material, or the like.

The acoustic absorption layer is preferably comprised of an organic or inorganic fiber felt or the like which is directly bound to the supporting sublayer. Alternatively, the acoustic absorption layer may be fixed by clipping it onto the supporting sublayer with the use of clip means, or fixing it by other mechanical anchoring means, e.g. pegs, plugs, screw means, clamp means, or the like.

The heat- and acoustic noise source is first subjected to suitable acoustic damping means (in the form of the fiber felt), disposed near the heat- and noise source, and achieving appreciable acoustic damping. This advantageous acoustic damping is attributable to the inventive arrangement.

A further advantage of the invention is that it simultaneously achieves advantageous heat insulation. Although a substantial part of the heat penetrates through the acoustic absorption layer and the supporting sublayer, and thereby comes to impinge upon the inner side of the heat-shielding sheet, it is mostly reflected from the inner side, and directed generally back toward the heat- and acoustic noise source. Accordingly, the heat-shielding sheet is not substantially heated, and only a small amount of heat penetrates through it.

In lieu of the above-described fiber felt, which may be comprised of, e.g., organic or inorganic material, one may use other heat-resistant materials which are suitable for attaching to a support sublayer of the type described, by means of suitable attachment structure. Some alternative acoustic damping materials which may be used are foamed mineral materials (such as expanded mica), mineral fibers, expanded clay materials, and the like. It is important that the materials be heat resistant up to at least c. 400° C., in addition to having the first and second layers are preferably releasably attached to the third, heat shielding layer, in order to facilitate recycling of the heat shield. The releasable attachment may be readily accomplished by providing lugs on the heat-shielding sheet which extend laterally from said sheet, wherewith by bending said lugs around the edge regions of the second, supporting layer the lugs engage and hold said second layer.

According to another embodiment, other releasable fixing means may be employed, e.g. clips, pegs, plugs, screws, or the like.

Further, the holding and mounting means may extend through both of the aluminum sheets (heat-shielding sheet and supporting sublayer) and the acoustic absorption layer, and thereby the supporting sublayer bearing the absorption material is mounted to the vehicle body simultaneously with the mounting of the heat-shielding sheet to the vehicle body.

Regarding the engineering design of the heat-shielding sheet, essentially any known type of heat-shielding sheet construction may be employed, and in particular a multi-layered laminar construction.

BRIEF DESCRIPTION OF THE DRAWING

The present invention will be better understood from the following detailed description of some preferred embodi

DESCRIPTION OF THE PREFERRED EMBODIMENTS

Figure 1:
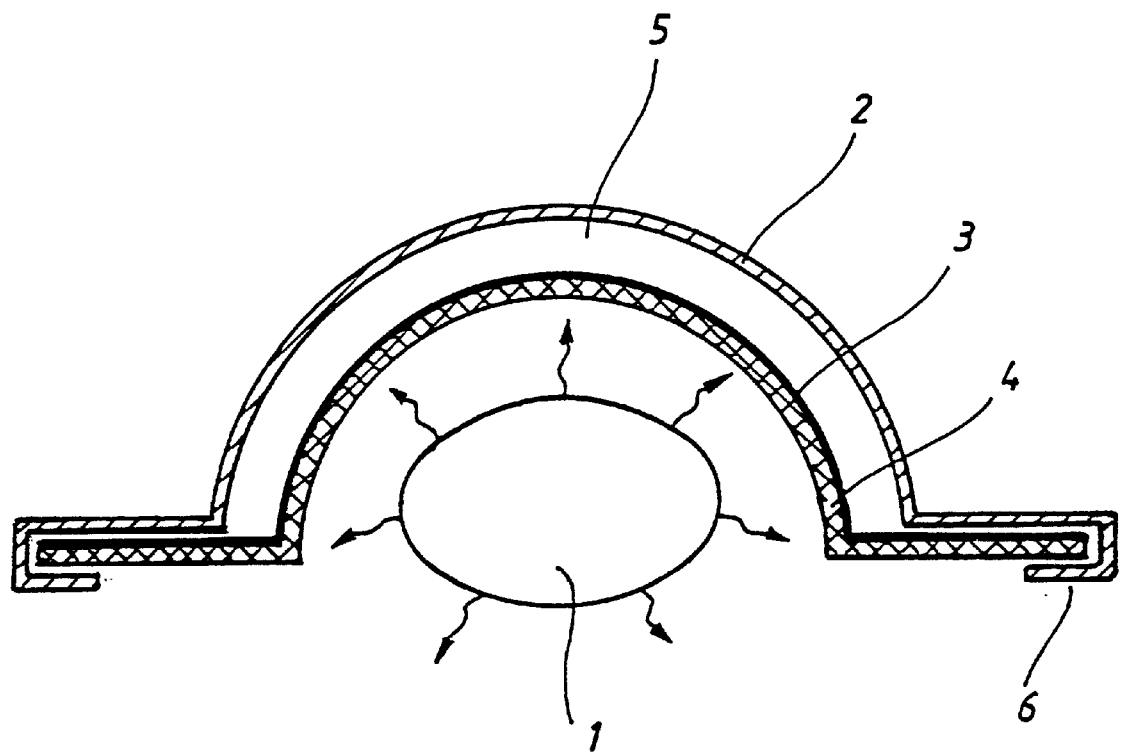
- FIG. 1 is a schematic cross-sectional view of a heat shield with acoustic insulation according to a preferred embodiment of the invention

The described heat shield with acoustic insulation provides shielding against the effects of a heat- and acoustic noise-emitting source 1 (hereinafter, "heat and noise source 1").

For this purpose, a heat-shielding sheet or the like, 2, of known construction, is provided, which is highly reflective at least on its inner side, i.e. the surface facing the source 1. This known heat-shielding sheet 2, in known fashion, is comprised of an aluminum sheet of thickness, e.g., 0.5–1.5 mm, having a suitable shape; or is comprised of a plurality of sheets, foils, or the like.

A supporting sublayer 3 is disposed at a defined distance from the inner side of the sheet 2, to form a free air gap 5 between sheet 2 and sublayer 3. Sublayer 3 may be comprised of, e.g., aluminum foil of thickness 0.2 mm.

An acoustic absorption layer 4 is applied to the inner side of the sublayer 3. The acoustic absorption layer 4 may comprise a fiber felt material comprised of organic or inorganic fibers, for example, which material is heat-resistant. Other suitable acoustic absorbing materials for layer 4 are foamed mineral materials (such as expanded mica), mineral fibers, expanded clay material, and the like. Preferably, acoustic absorption layer 4 is mechanically bound to the sublayer 3.

In order to enable the heat shield with acoustic insulation to be recycled easily, one must be able to easily separate the heat-shielding sheet 2 from the supporting sublayer 3 which bears the acoustic insulating layer 4. Accordingly, the sublayer 3 is preferably attached to the heat-shielding sheet 2 by forming a bead (rolled edge) of the edge region 6 of the heat-shielding sheet 2 around the edge region or flange of the sublayer 3, whereby the said edge region or flange of the sublayer 3 is held by being pinched therein.

Although some preferred embodiments of the invention have been described above by way of example only, it will be understood by those skilled in the field that modifications may be made to the disclosed embodiments without departing from the scope of the invention, which is defined by the appended claims. The claimed matter of the present invention encompasses not only the individual claims but also combinations of said claims.

I claim:

1. A heat shield with acoustic insulation, comprising:
    a first, acoustic absorption layer having opposite first and second sides;
    a second, supporting layer affixed to the second side of the acoustic absorption layer; and
    a third, heat-shielding layer attached to said first and second layers and spaced from said second layer to define an air gap between said second and third layers.

2. The heat shield as claimed in claim 1, wherein the heat-shielding layer comprises at least one layer of aluminum sheet material.

3. The heat shield as claimed in claim 1, wherein the heat-shielding layer comprises at least one layer of aluminum foil.

4. The heat shield as claimed in claim 1, wherein the heat-shielding layer has a first side facing the second layer, the first side having reflecting characteristics.

5. The heat shield as claimed in claim 1, wherein the second, supporting layer is a metal sheet.

6. The heat shield as claimed in claim 1, wherein the second, supporting layer is a metal film.

7. The heat shield as claimed in claim 1, wherein the acoustic absorbing layer is of a material selected from the following group: organic fiber felt material, inorganic fiber felt material, and a mixture of organic and inorganic fiber felt material.

8. The heat shield as claimed in claim 1, wherein the supporting layer is releasably secured to the heat-shielding layer.

9. A heat shield with acoustic insulation, comprising:
    a heat-shielding layer having a first side for facing a heat and acoustic noise emitting source and a second side;
    an acoustic absorbing member secured to the heat-shielding layer and spaced from the first side of the heat shielding layer to define an air gap; and
    the acoustic absorbing member comprising a first layer of acoustic absorbing material and a second, supporting layer secured to the first layer, the acoustic absorbing layer facing the heat and noise emitting source.

* * * * *